Figure 1:
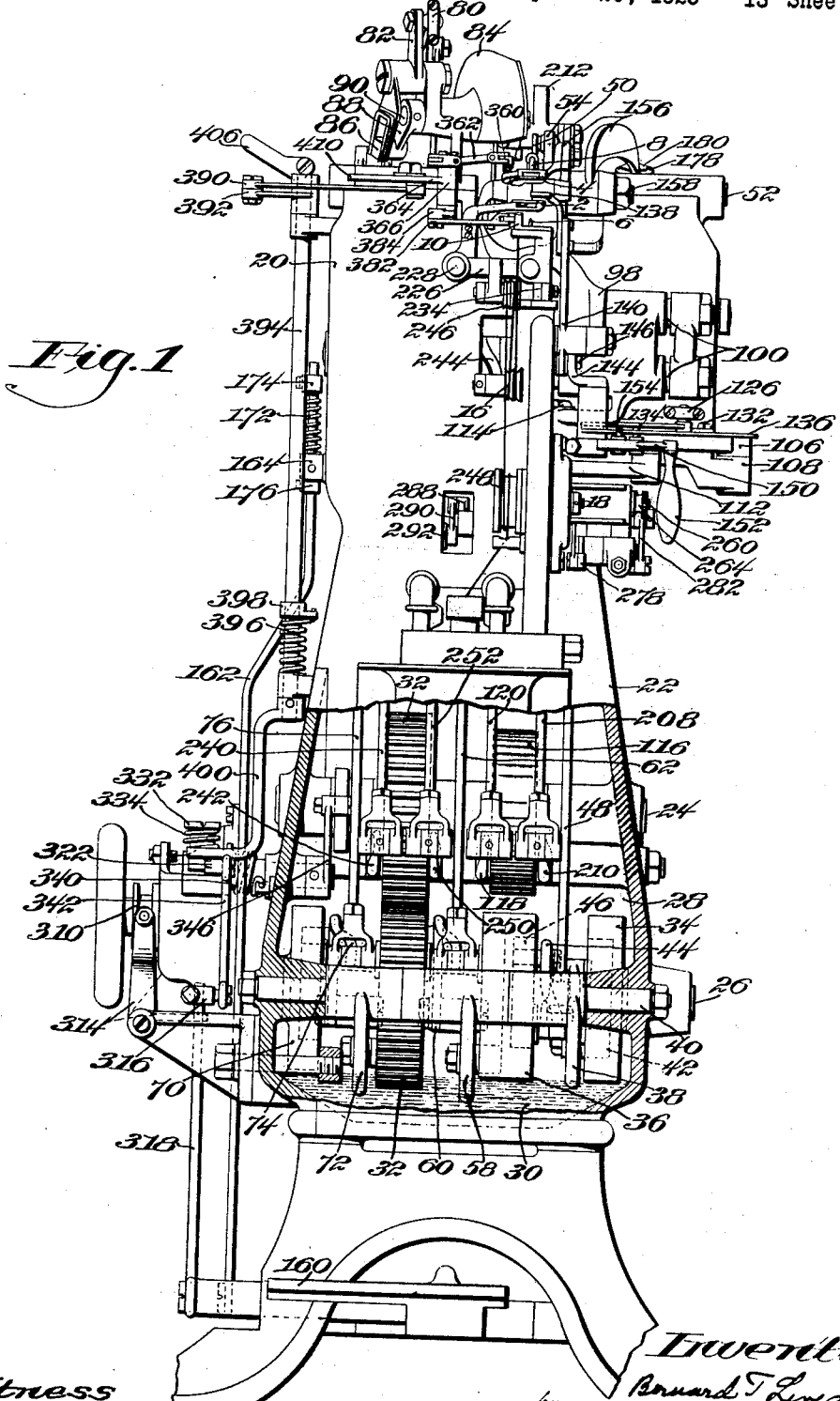

April 17, 1934.    B. T. LEVEQUE    1,954,821
SEWING MACHINE
Original Filed April 26, 1923    13 Sheets-Sheet 4

April 17, 1934.  B. T. LEVEQUE  1,954,821
SEWING MACHINE
Original Filed April 26, 1923   13 Sheets-Sheet 6

Inventor
Bernard T. Leveque
by
Van Everen Fish Hildreth & Cary
Attys

Witness
Jas J Maloney

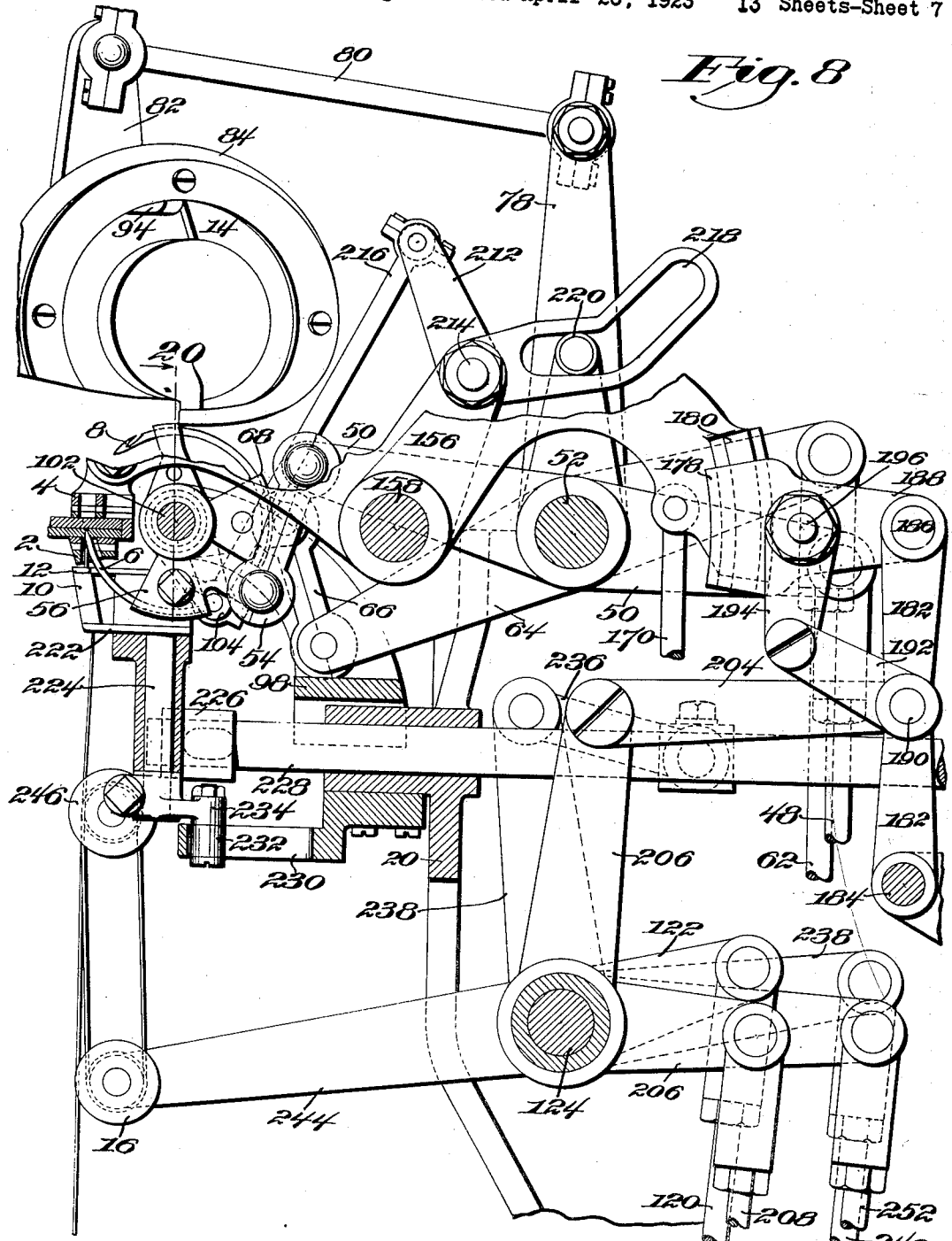

April 17, 1934.                B. T. LEVEQUE                1,954,821
                                SEWING MACHINE
                    Original Filed April 26, 1923    13 Sheets-Sheet 8
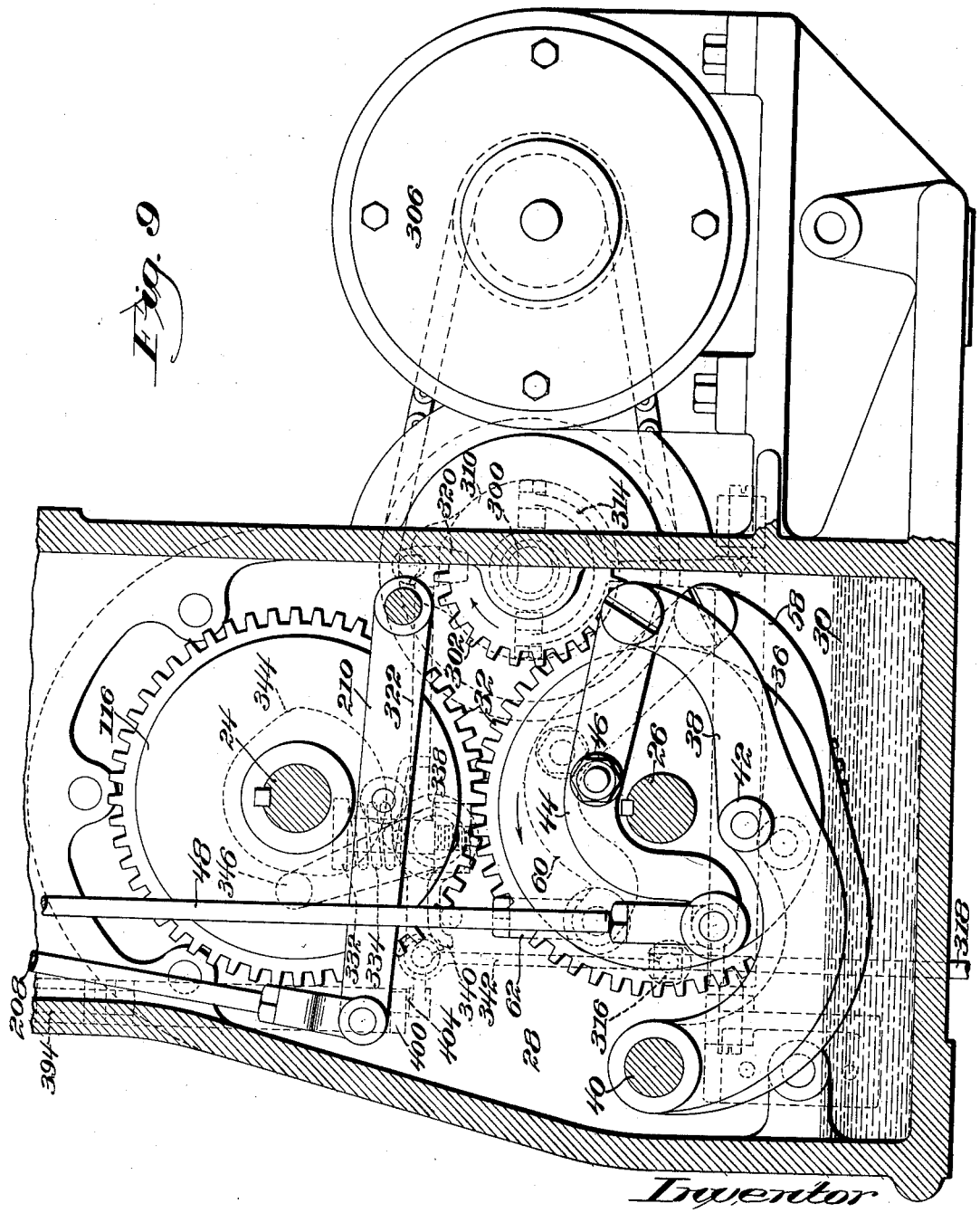

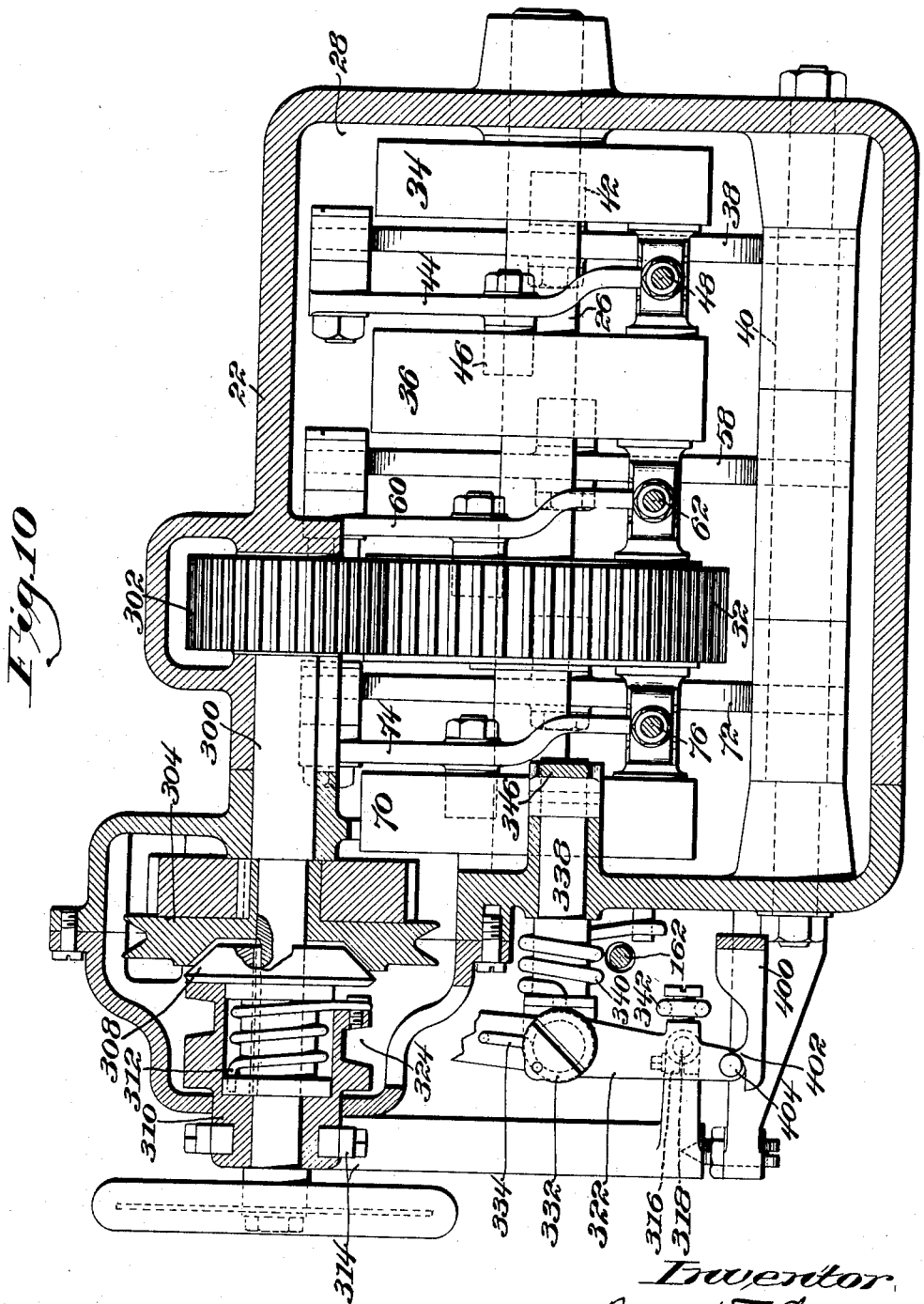

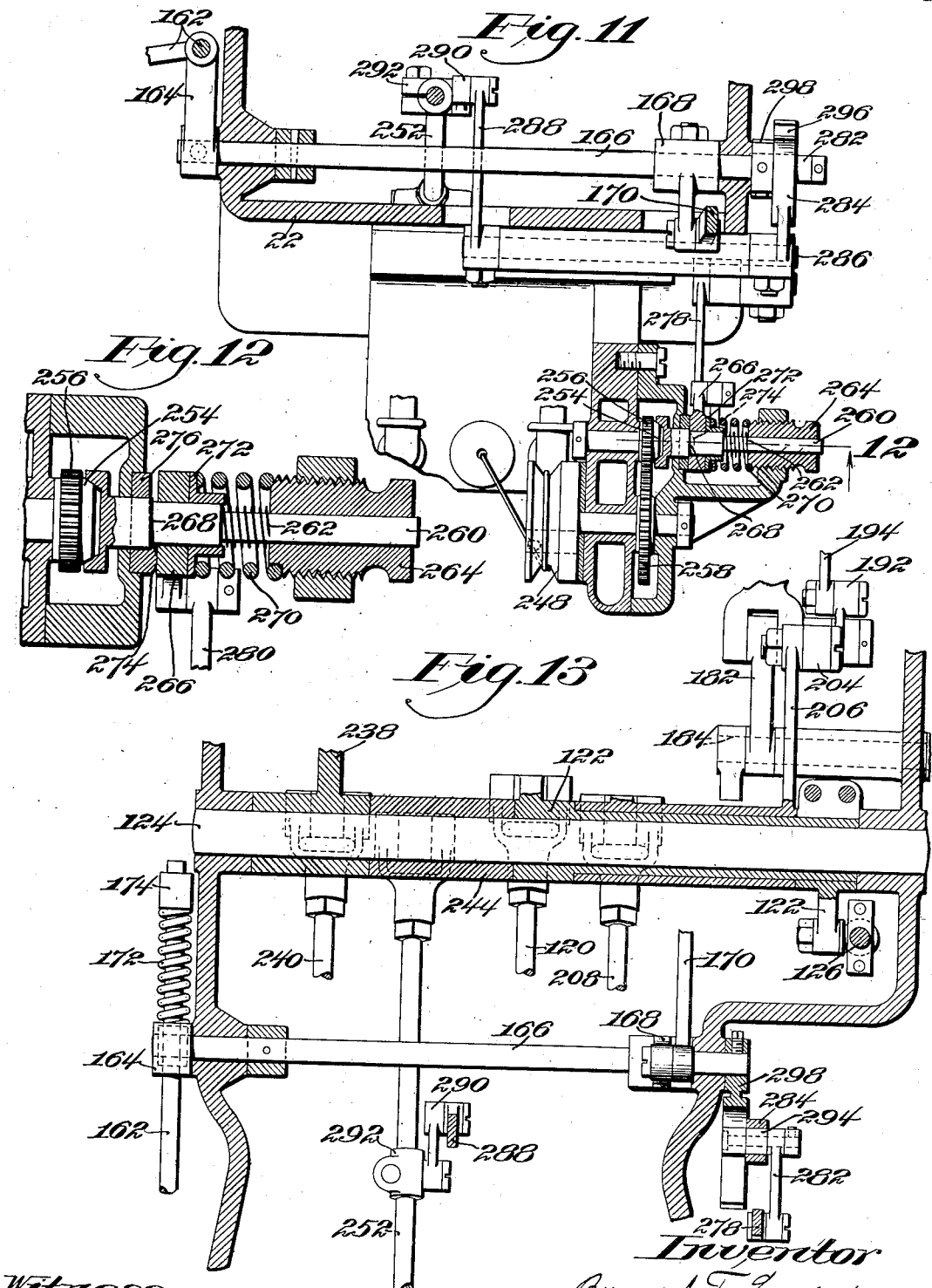

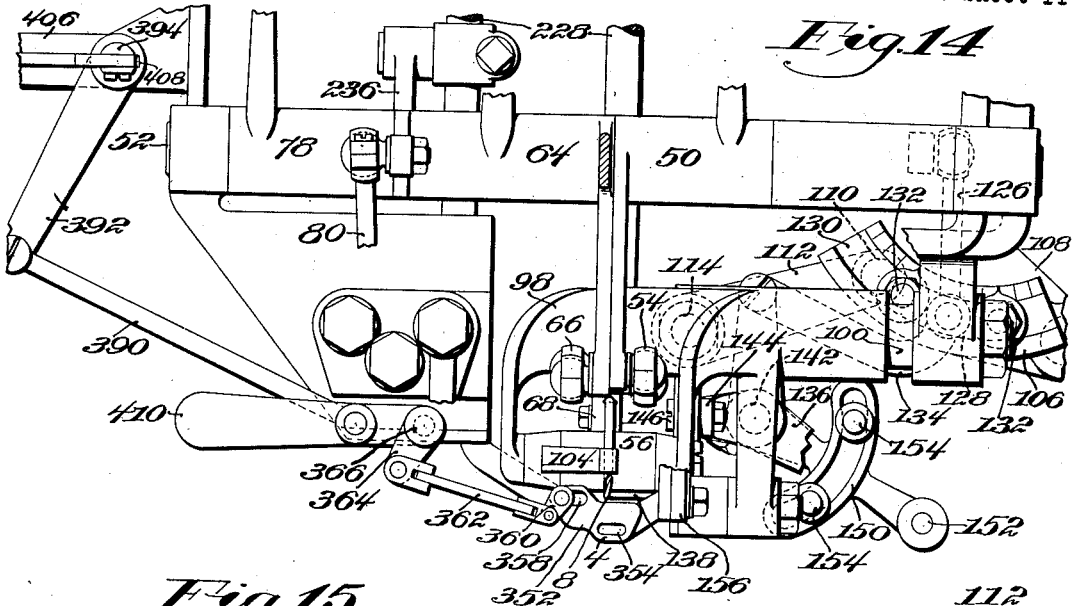
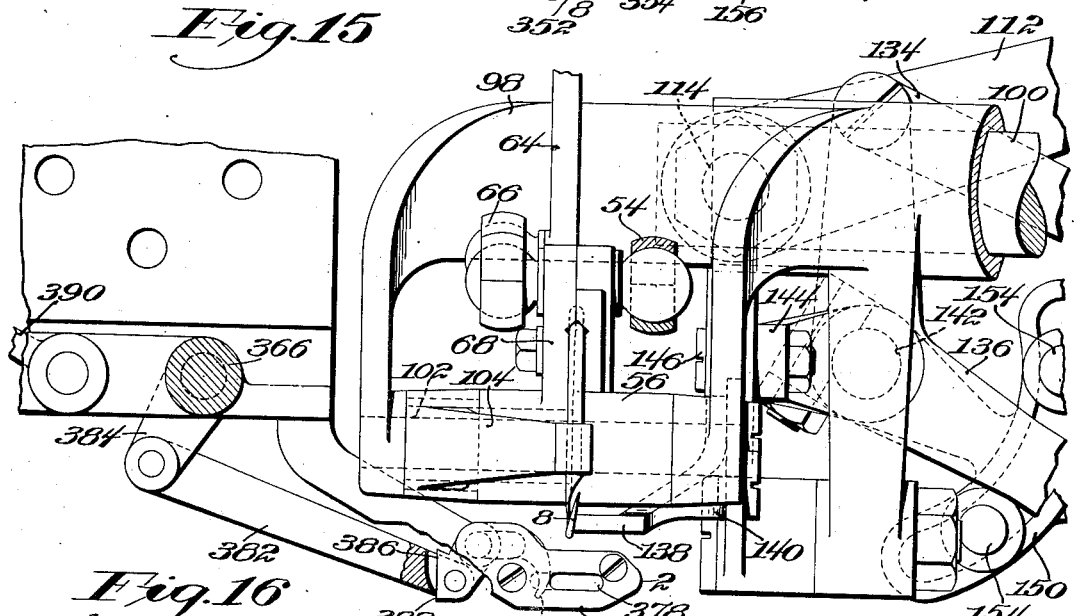
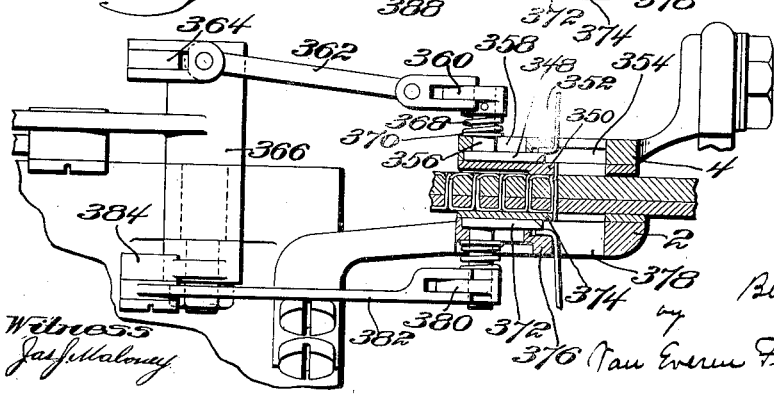

April 17, 1934.　　　　　B. T. LEVEQUE　　　　　1,954,821
SEWING MACHINE
Original Filed April 26, 1923　　13 Sheets-Sheet 12
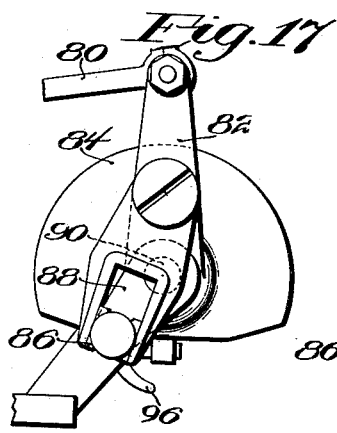
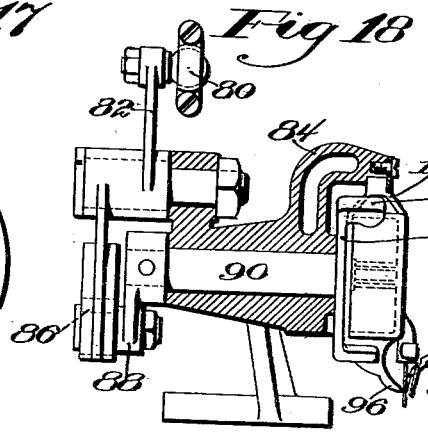
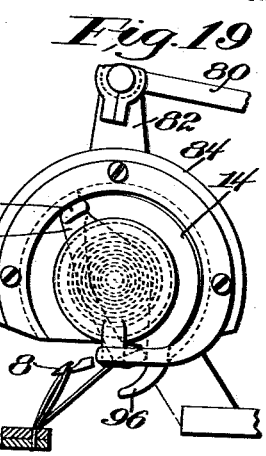
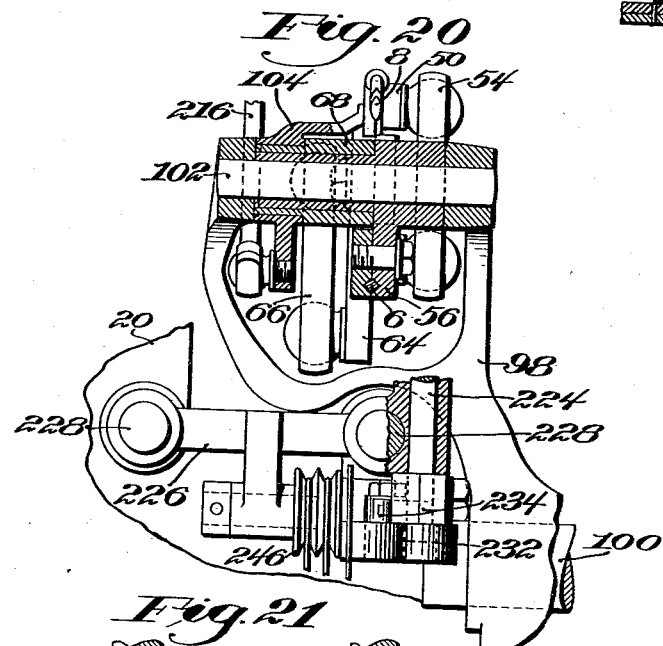
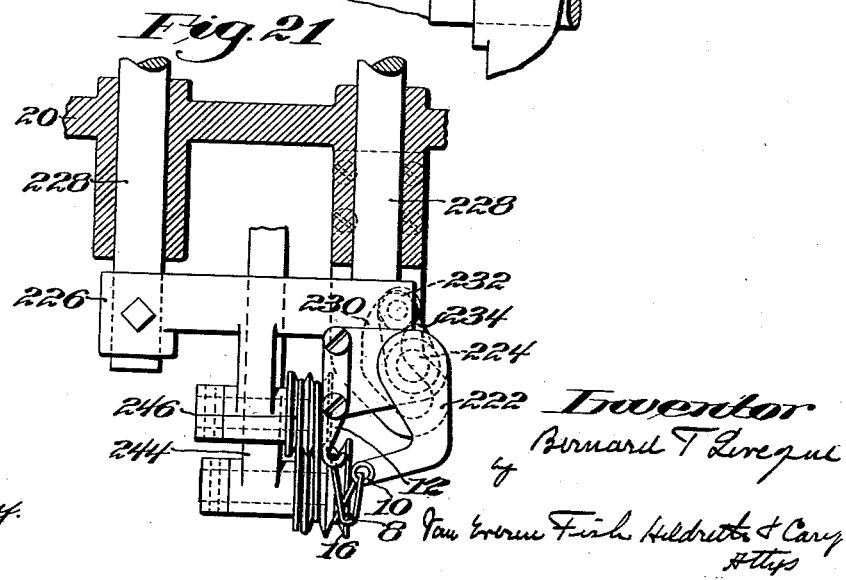

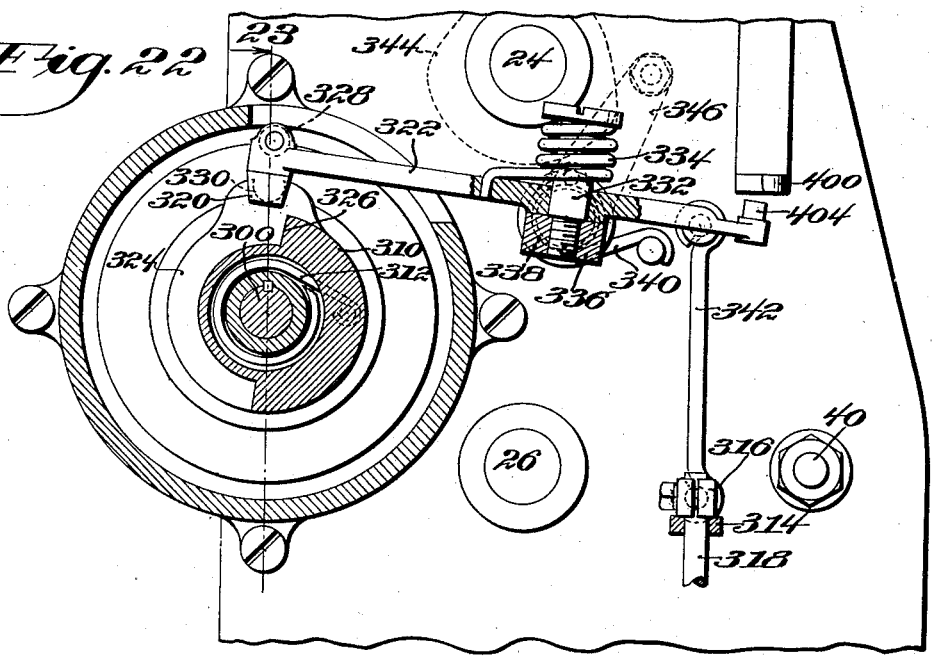
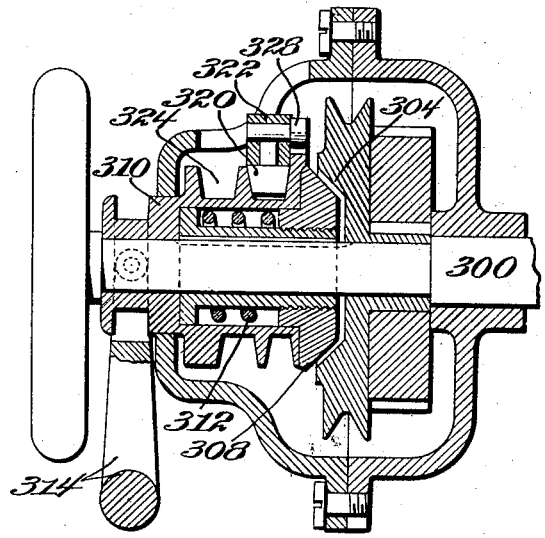

Patented Apr. 17, 1934

1,954,821

UNITED STATES PATENT OFFICE 1,954,821

SEWING MACHINE

Bernard T. Leveque, Wenham, Mass., assignor to United Shoe Machinery Corporation, Paterson, N. J., a corporation of New Jersey Application April 26, 1923, Serial No. 634,751
Renewed January 6, 1932

44 Claims. (Cl. 112—37)

The invention relates to lock stitch wax thread sewing machines such as are adapted for stitching the outsoles of shoes.

The object of the invention is to so construct and arrange the parts and mechanisms of a machine of this class that it may be run at a high speed without objectionable vibrations or undue wear or strain on the parts, and when so run will operate in the usual reliable manner. In securing this result certain features of invention have been utilized which are not confined in their application to sewing machines but may be utilized with advantage in machines for performing other operations on shoes or parts of shoes. One of these features relates more particularly to the construction and relative arrangement of the operating cams and connections through which motion is transmitted to the instrumentalities operating on the work. In accordance with this feature the operating instrumentalities are mounted in the machine head while the operating cams are mounted in the base and are connected to actuate the instruments through levers engaged by the cams and connected by links with a second set of levers mounted in the head back of the instruments and connected therewith. This arrangement reduces the vibrations due to the high speed operation of the cams and also permits the cams to run in a chamber containing an oil bath which secures constant and sufficient lubrication of the cams. In the case of wax thread sewing machines or other machines requiring heating of the operating instruments carried by the head the arrangement also removes the cams from the heated area which, with the usual constructions, impairs the lubrication of the cams and consequently increases the wear and reduces the permissible speed of operation.

Another of these features relates to the arrangement of the actuating cams and cam levers so that a comparatively wide oscillation of an oscillating instrument may be secured with comparatively small and easy acting cams. This arrangement comprises two cams, and two cam levers, one of which is mounted on the other so that the throw of the former lever is the resultant of the throw of the two cams. The cam throw may thus be divided between the two cams with a resulting decrease in the size of cam required in order to permit the use of an easy acting cam inclination.

Figure 2:
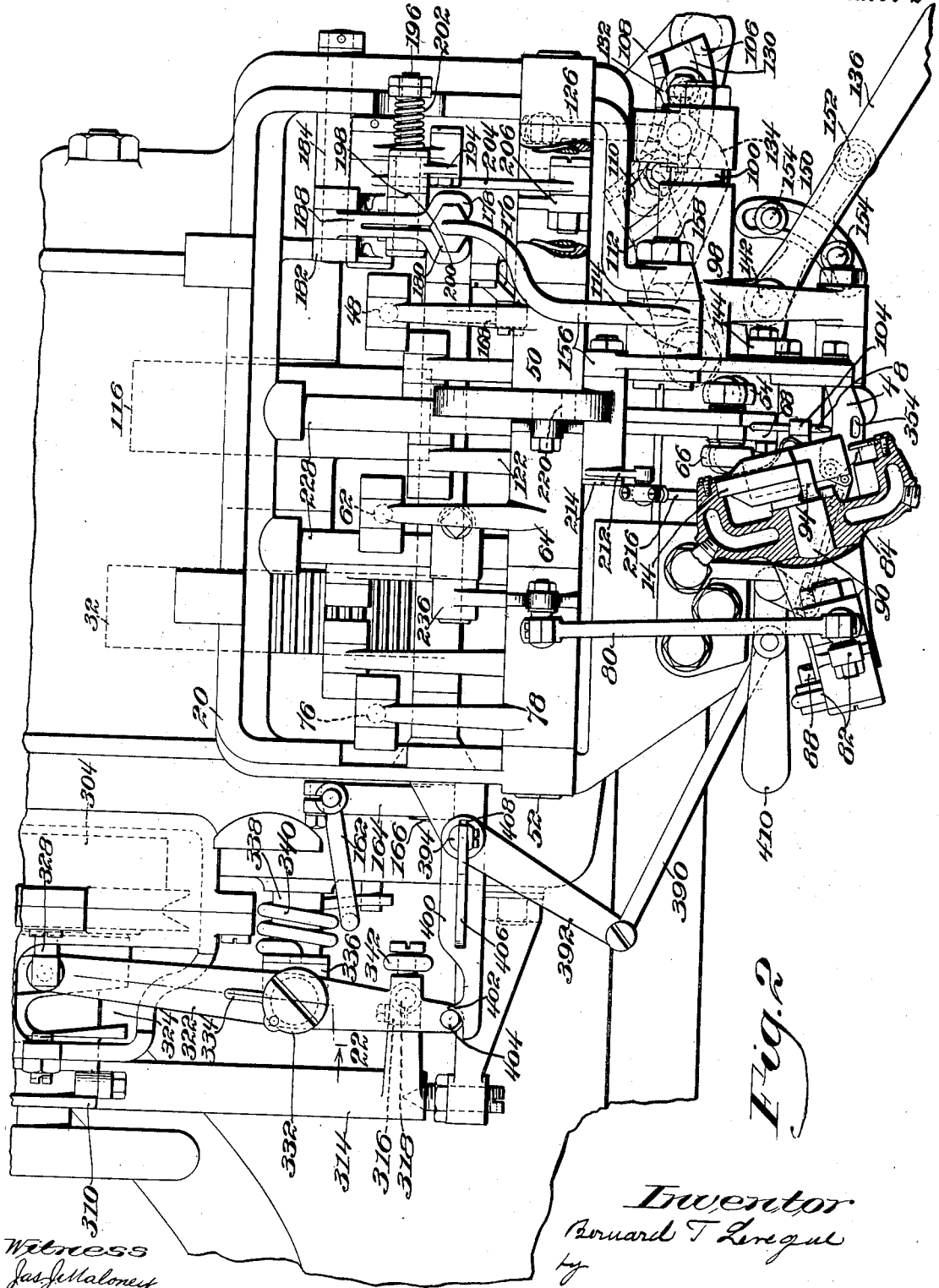
Figure 3:
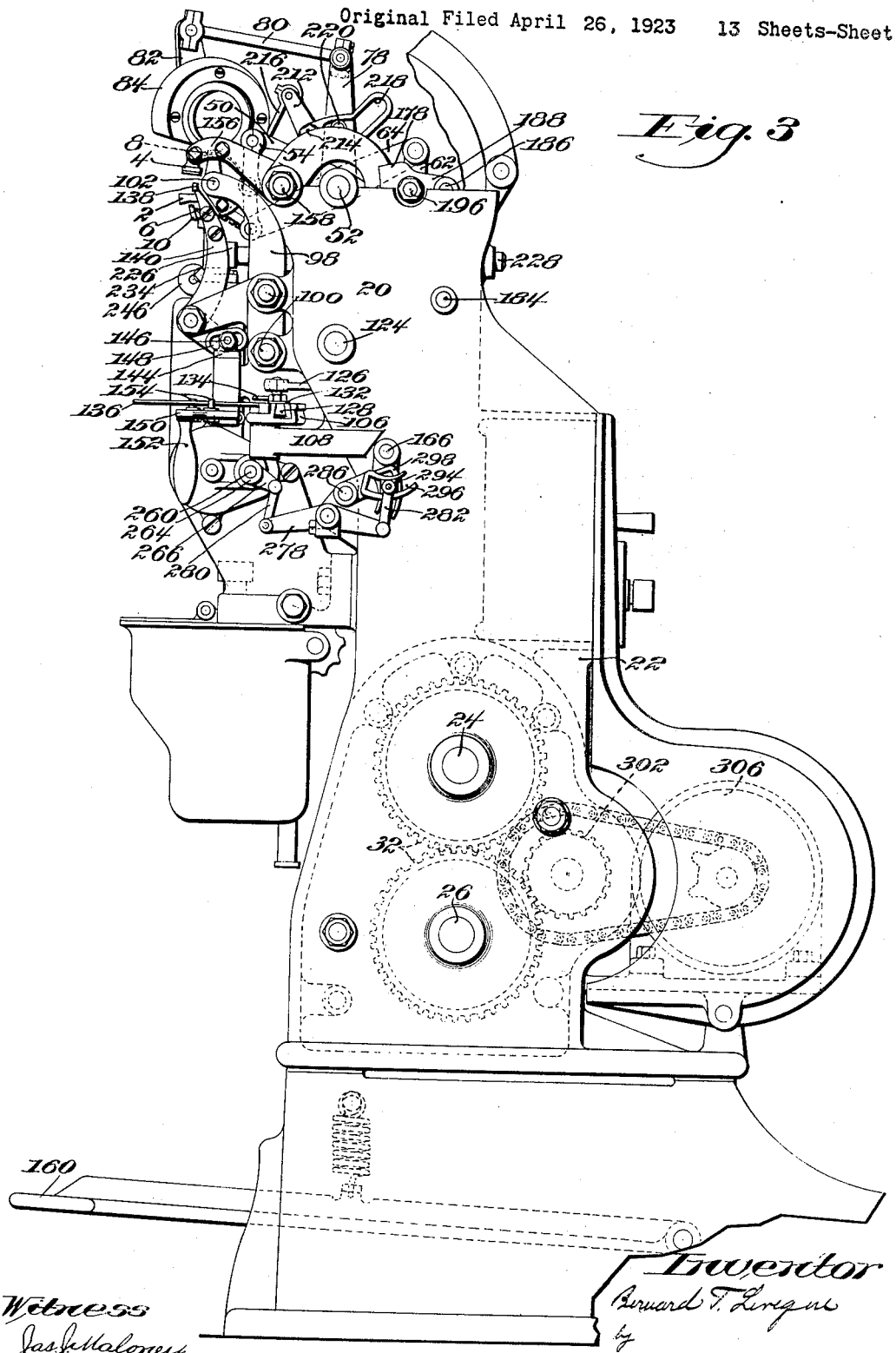
Figure 4:
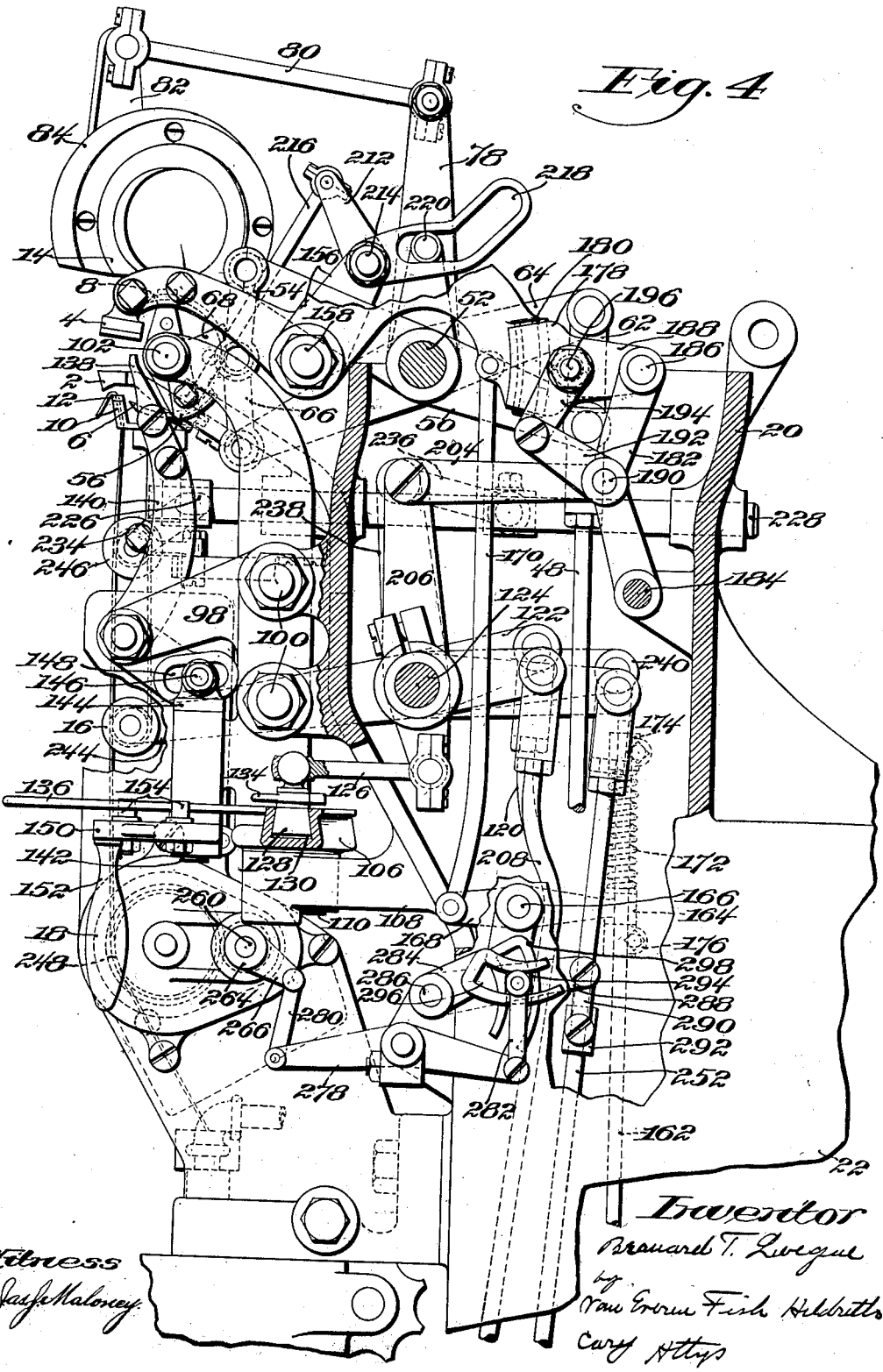
Figure 5:
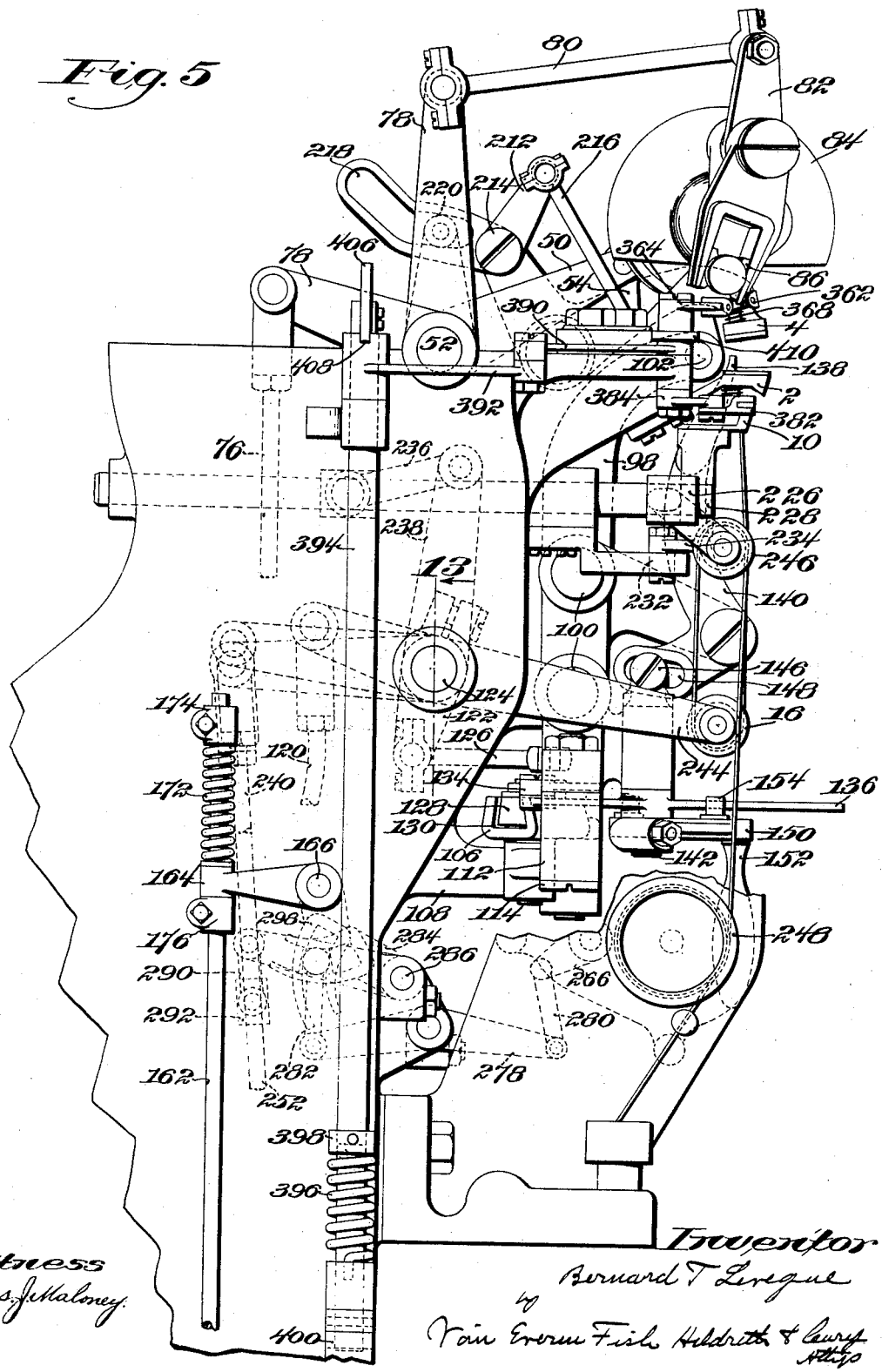
Figures 6, 7:
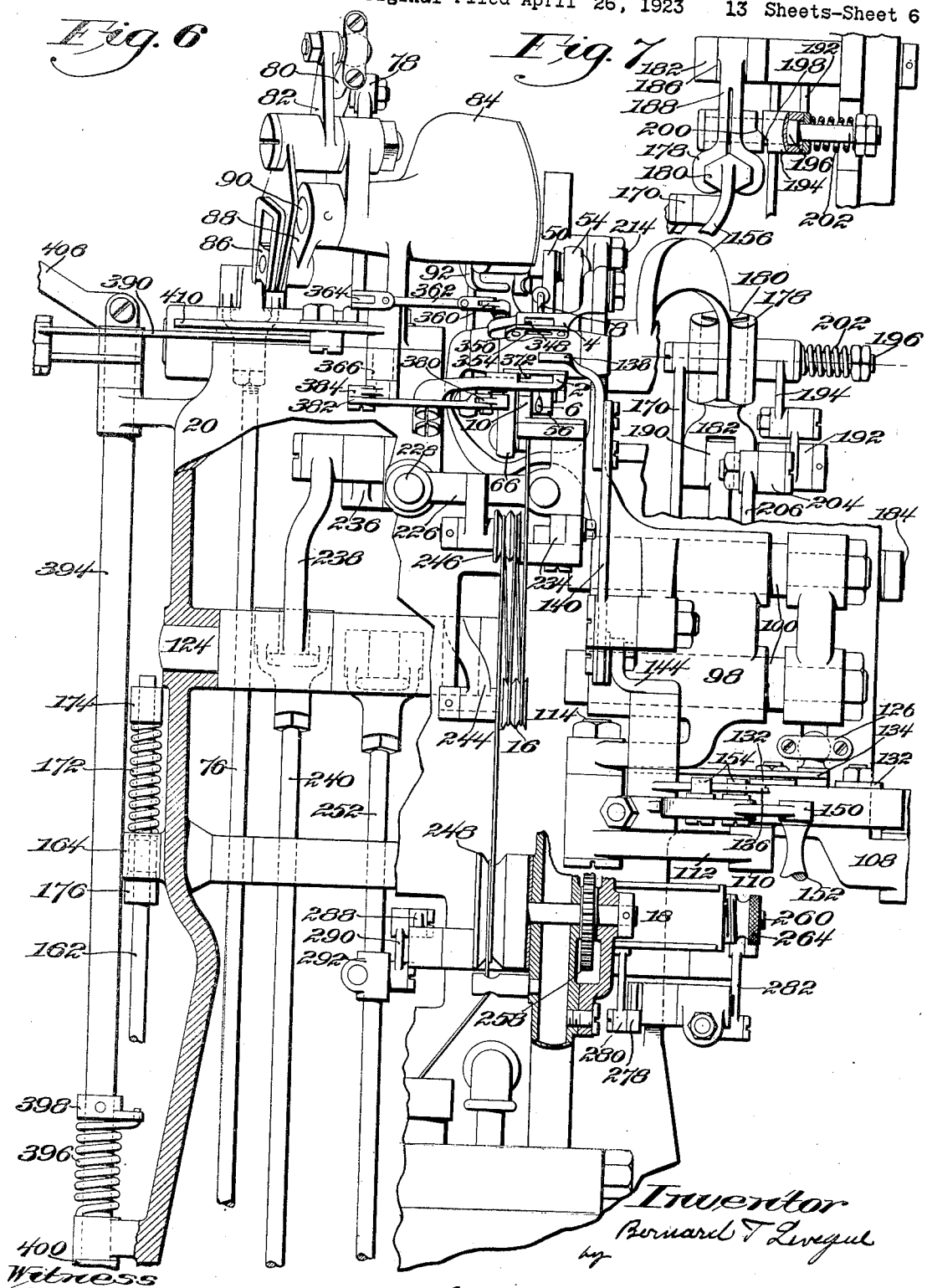

The features outlined above, as well as the other features of the invention relating to mechanisms of a lock stitch sewing machine, are illustrated in the accompanying drawings in which Fig. 1 is a front elevation partly in section of a machine illustrating one embodiment of the invention applied to an outsole sewing machine, Fig. 2 is a plan view, Fig. 3 is a right hand side elevation, Fig. 4 is a right hand side elevation partly in section showing the operating instrumentalities which are mounted in the head of the machine, Fig. 5 is a left hand side elevation of the head and parts mounted therein, Fig. 6 is a front elevation of the head and parts mounted therein, parts of the frame being broken away, Fig. 7 is a detail plan view of part of the presser foot operating mechanism, Fig. 8 is a sectional elevation showing the stitch forming devices and the presser foot operating mechanism, Fig. 9 is a sectional side elevation showing the actuating cams and levers which are mounted in the base of the machine, Fig. 10 is a sectional plan view of the parts shown in Fig. 9, Fig. 11 is a detail view partly in section showing the thread lock, Fig. 12 is a sectional detail on line 12, Fig. 11, Fig. 13 is a sectional detail on line 13, Fig. 5, Fig. 14 is a detail plan view of the work feeding mechanism, Fig. 15 is a similar view on somewhat larger scale with the presser foot removed, Fig. 16 is a sectional elevation showing the thread cutting devices, Figs. 17, 18 and 19 are detailed views showing the shuttle mechanism, Fig. 20 is a sectional detail on line 20, Fig 8, Fig. 21 is a detailed plan view of the looper and thread finger, Fig. 22 is a detailed sectional view on line 22, Fig. 2, and Fig. 23 is a sectional detail on line 23, Fig. 22.

In the drawings the invention is illustrated as embodied in a lock stitch wax thread shoe sewing machine and the operating instrumentalities are designed to sew the outseam of a lasted shoe. This machine is provided with a work support 2, a presser foot 4, an awl 6, a curved hook needle 8, a looper 10, a thread finger 12, an oscillating shuttle 14, a combined take-up and pull-off 16, and a thread tension and lock 18 (Figs. 1 to 8). These instrumentalities are mounted in the machine head 20 which is carried or formed on the upper end of the casing 22. The actuating cams are mounted in the casing below the head and as shown are carried on two shafts 24 and 26 within a chamber 28 formed in the lower end of the casing and adapted to hold an oil bath as indicated at 30 in Figs. 1 and 9. The cam levers are also mounted within the chamber and are connected by a series of vertical connecting rods with levers which are mounted in the head back of the instruments to which they transmit motion. The advantages secured by this construction and arrangement have already been referred to.

The shaft 26 carries the cams for oscillating the awl, the needle, and the shuttle, while the remaining actuating cams are carried by the shaft 24. The two shafts are connected to rotate in unison by intermeshing gears 32, the lower one of which may dip into the oil in the chamber and thus cause the oil to be splashed and sprayed onto the cams or cam followers to insure a constant adequate lubrication. The lower cam levers may also dip into the oil to increase its distribution.

The mechanism for oscillating the awl comprises two cams formed in the opposed faces of disks 34 and 36 which are secured to shaft 26, and a compound lever consisting of a lever 38 mounted on a fixed pivot 40 and provided with a roll 42 engaging the cam in disk 34, and a second lever 44 pivoted on the free end of lever 38 and provided with a cam roll 46 engaging the cam in disk 36. The free end of each lever is on the opposite side of the shaft 26 from its fulcrum and the cams are so shaped and timed that each augments the movement of the free end of lever 44 due to the other. The free end of this lever may thus be given a comparatively wide range of movement by comparatively small cams having comparatively gentle cam inclinations and adapted to run at high speed. The free end of the lever is connected by a vertical rod 48 with the rear end of a lever 50 mounted to turn about a shaft 52 which is arranged in the head of the machine back of the thread handling and work feeding instruments (Figs. 4 and 8). The forward end of the lever is connected by a link 54 with the awl carrying segment 56, the ends of the link being connected with the lever and segment by universal joints to permit movement of the awl in the line of feed. The mechanism for oscillating the needle is the same in construction and arrangement as that for oscillating the awl and comprises two cams formed in the opposed faces of the cam disk 36 and the lower gear 32, the compound lever comprising the levers 58 and 60, the vertical connecting rod 62, the lever 64 mounted on shaft 52, and the link 66 connecting this lever with the needle segment 68. The shuttle is also oscillated by a similar mechanism comprising two cams formed in the opposing faces of the cam disk 70 and of the lower gear 32, the compound lever 72, 74, the vertical connecting rod 76 and the lever 78 mounted on the shaft 52. The lever 78 is provided with a vertical arm, the upper end of which is connected by a link 80 and universal joints with one arm of a lever 82 which is mounted on the shuttle race bracket 84. The lower end of the lever 82 is slotted to engage a pivot block 86 carried on a crank 88 secured to the shuttle driver shaft 90. Through these mechanisms the needle, awl and shuttle may each be given the requisite amplitude of oscillation by cams of comparatively small diameter and having a cam inclination which will permit them to be run at high speed with comparatively little wear and strain on the parts.

In the construction shown the shuttle is oscillated in the bracket 84 by the usual shuttle driver 92 provided with the projecting shuttle engaging lugs 94 (Figs. 17 to 19). The shuttle is provided with a laterally projecting beak 96 and the plane in which the beak of the shuttle oscillates is slightly inclined to the plane in which the needle oscillates. The shuttle is so located that the loop of thread drawn through the work by the needle is directly engaged or entered by the shuttle beak when it is travelling in a direction opposite to that in which the needle travels in drawing the loop. The shuttle thus takes the loop directly from the needle while travelling toward the needle hook and as the shuttle enters the loop the needle is advanced or dipped to free the thread from the hook and transfer it to the shuttle. This construction and mode of operation permits the needle loop to be taken directly from the needle by the shuttle, while the needle hook may be formed on the outside of the needle where it will act with certainty in receiving the thread from the looper and drawing it through the work into position to be entered by the shuttle.

The feed of the work is effected by the awl which is carried on a feed slide mounted to reciprocate in the line of feed and in the machine illustrated the needle segment is mounted on the feed slide to oscillate about the same axis so that the awl and needle are maintained in permanent alinement throughout the sewing, thus insuring their accurate and uniform cooperation. As shown the feed slide 98 is mounted to reciprocate upon two fixed studs 100. The slide is provided with an upwardly extending yoke-shaped arm which carries at its upper end the stud 102 on which the awl and needle segments are mounted to oscillate (Fig. 20). The hub of the awl segment 56 fits between the arms of the yoke and at one side of the segment forms a bearing for the hub of the needle segment 68 which in turn is provided with a bearing for the hub of the needle guide segment 104.

The mechanism for reciprocating the feed slide comprises a toggle, the central joint of which is moved from a point at one side of the line of centers to a point slightly beyond the line of centers in moving the feed slide to feed the work. The feed slide is thus given a slight reverse movement at the completion of its advance or feeding movement, which tends to eliminate inaccuracies of feed due to overthrow of the feed mechanism or wear and back lash in the connections, and to relieve the lateral strain on the awl which might tend to deflect it out of accurate alinement with the needle. As shown the toggle for advancing and retracting the feed slide comprises the link 106, one end of which is pivoted to the bracket 108, and the other end of which is connected by the central joint 110 of the toggle to one end of the other link 112. The other end of the link 112 is pivoted at 114 to the feed slide (Figs. 4, 14 and 15). The central joint of the toggle is reciprocated to advance and retract the feed slide by a cam formed in the side of a disk 116 which is secured to the shaft 24 (Figs. 1 and 9). The cam is engaged by a roll on a cam lever 118 the forward end of which is connected by a rod 120 to one arm of a bell crank lever 122 mounted on a shaft 124, the other arm of which is connected by a link 126 and universal joints with the link 106 of the toggle (Figs. 4 and 13). In order that the length of feed may be adjusted the forward end of the link 126 is connected to a pivot block 128, mounted to slide in a curved slot 130 formed in the link. The curvature of the slot is such that when the feed slide is in its advanced position the slot is concentric with the point of connection between the inner end of the link and the bell crank lever 122. Adjustment of the pivot block in the slot therefore varies the point to which the central joint of the toggle is moved in retracting the feed slide without varying the point to which the slide is advanced. In order that the operator may readily change the length of stitch as, for instance, in passing from the shank to forepart, or from the forepart to the shank, stops 132 are adjustably secured in the slot 130 to limit the movement of the pivot block 128 in either direction, and this block is connected by a link 134 with a lever 136 pivoted on the feed slide and provided with a handle within convenient reach of the operator.

The machine is provided with an edge gage 138 secured on the upper end of a lever 140 which is mounted on the feed slide so that it may be rocked to move the edge gage into and out of action. The means for rocking the lever comprises a rock shaft 142 mounted in the feed slide and provided at its upper end with an arm 144 carrying a pin 146 projecting into a slot 148 in the lever. An arm 150 is secured to the lower end of the rock shaft and is provided with a depending handle 152 by which the operator may conveniently move the edge gage into and out of action. The arm 150 is provided with stop pins 154 adjustably secured in a slot formed in the arm and arranged on opposite sides of the lever 136. If desired these stops may be so adjusted that movement of the lever 136 to shorten the stitch in passing from the shank to the forepart will also move the edge gage into active position, and movement of the lever to lengthen the stitch in passing from the forepart to the shank will move the edge gage out of active position, and at the same time the edge gage may be independently adjusted by the operator when it is in active position.

The presser foot 4 is secured upon the forward end of a presser foot lever 156 which is mounted on a fixed stud 158. The presser foot lever is rocked to press the foot yieldingly against the work in depressing the starting treadle 160 through a rod 162, the lower end of which is connected to the treadle, and the upper end of which is yieldingly connected with an arm 164 secured to a rock shaft 166 which is also provided with an arm 168 connected by a link 170 with the rear arm of the presser foot lever, (Figs. 1, 4, 8 and 13). The yielding connection between the rod 162 and arm 164 consists of a spring 172 interposed between the arm 164 and a collar 174 secured to the upper end of the rod. This spring holds a collar 176 which is secured on the rod against the under side of the arm and yields to permit continued movement of the starting treadle after the presser foot has engaged the work so that the presser foot is yieldingly pressed against the work and accommodates itself to various thicknesses. The spring continues to apply yielding pressure to the presser foot lever during the sewing and until the starting treadle is released at the completion of the seam.

During the sewing the presser foot is locked and positively forced downward against the work a uniform distance during each cycle of the machine by a clamp 178, the jaws of which embrace a rib 180 formed on the rear arm of the presser foot lever and means which actuates the clamp to grip and release the lever and which gives the clamp a pre-determined positive movement while gripping the lever. This means comprises a toggle 182, one link of which is connected to a fixed pivot 184 and the other member of which is pivotally connected at 186 to the rear end of the block 188 on the forward end of which the clamping jaws are formed. The central joint 190 of the toggle is connected by a link 192 with a lever 194 mounted on a clamping stud 196 and provided with a cam 198 cooperating with a stationary cam 200 formed on one of the clamp jaws 178 (Fig. 7). When the toggle is straightened by moving its central joint from the position indicated in Fig. 4 to the position indicated in Fig. 8 the lever 194 is rocked so that the cams 198 and 200 force the lever toward the right in Fig. 7, thus compressing the spring 202 and forcing the jaws of the clamp into gripping engagement with the rib 180. After the clamp is thus engaged with the presser foot lever the final straightening movement of the toggle positively and forcibly advances the presser foot to compress the work and hold it during the forming and setting of the stitch. When the central joint of the toggle is returned to initial position preparatory to the feed of the work the clamp releases the presser foot lever so that the presser foot presses yieldingly upon the work and re-accommodates itself to any variation in thickness preparatory to the succeeding locking and final compressing movement of the presser foot. The central joint of the toggle is reciprocated through a link 204 connecting it with one arm of a bell crank lever 206 which is mounted on the shaft 124, and the other arm of which is connected by a rod 208 with the forward end of a lever 210 which carries a roll engaging a cam formed in one side of the cam disk 116 (Figs. 1, 4, 8 and 13).

In the machine illustrated the presser foot underlies the needle guide and the mechanism for oscillating the needle guide is so constructed that the advance stroke of the needle guide is controlled by the presser foot in order that the guide may move down close to the presser foot during the advance stroke of the needle, whatever the thickness of the work. For this purpose the needle guide is operated through a lever engaged and oscillated by an actuator, and the relative positions of the actuator and fulcrum of the lever are varied in accordance with the thickness of the work engaged by the presser foot to vary the forward oscillation of the needle guide. As shown the needle guide is oscillated from a lever 212 pivoted at 214 upon an arm of the presser foot lever and having its forward end connected by a link 216 with the needle guide segment 104 (Figs. 4, 8 and 20). The rear arm of the lever 212 is provided with a cam slot 218 engaged by an actuator roll 220 carried on an arm of the needle operating lever 64. With this construction the position of the fulcrum 214 of the needle guide operating lever with relation to the path of oscillation of the actuator roll 220 will vary with the thickness of the work engaged by the presser foot and the limit of the forward stroke of the needle guide will be correspondingly varied so that the needle guide will uniformly be advanced to a position close to the upper side of the presser foot, whatever the thickness of the work engaged by the foot.

The looper 10 is formed on the forward end of a looper carrier arm 222 secured on the upper end of a shaft 224 which is mounted in a support 226. The support is in the form of a slide comprising a head in which the shaft of the looper carrier is mounted and two supporting and guiding rods 228 which are mounted in bearings to move forward and back or transversely of the direction of feed. The looper carrier shaft is rocked during the transverse movement of the slide to move the looper in the direction of the line of feed by a stationary cam slot 230 engaged by a roll 232 on an arm 234 secured at the lower end of the shaft. The looper slide is reciprocated through a link 236 connecting one of the rods 228 with the vertical arm of a bell crank lever 238, the horizontal arm of which is connected by a rod 240 with the forward end of a lever 242 which carries a roll engaging a cam formed in one face of the upper gear 32. The thread finger 12 is secured in fixed position on the looper slide and is advanced and retracted with the looper so that the provision of separate actuating mechanism therefor is avoided.

The take-up 16 consists of two pulleys mounted on the forward end of a take-up lever 244 and cooperating with two guide pulleys 246 which, for convenience, are mounted on the head of the looper slide (Figs. 1, 4, 7 and 8). The thread leading from the wax pot to the guide and take-up pulleys is wrapped around a tension pulley 248 which is locked against rotation and acts as a thread lock during the first part of the taking-up stroke of the take-up and which is released after the take-up has set the stitch and drawn the locking thread a pre-determined distance below the surface of the work to permit the take-up to thereafter act as a pull-off for pulling off from the thread supply the thread required for the next stitch. The take-up lever is mounted on the shaft 124 and is oscillated from a cam formed in the face of the upper gear 32 and engaging a roll on a lever 250, the forward end of which is connected by a rod 252 with the rear end of the take-up lever. The mechanism for thus locking and releasing the tension pulley comprises a friction brake 254, one member of which is formed on a pinion 256 engaging a gear 258 on the shaft of the tension pulley, and the other member of which is formed on an endwise movable shaft 260 (Figs. 11 and 12). A light spring 262 is interposed between a shoulder on the shaft and an adjustable sleeve 264 in which the shaft is guided and this spring acts to apply a light pressure to the brake, permitting the rotation of the tension pulley during the latter part of the stroke of the take-up. The means for applying the brake with a heavy pressure and thus locking the tension pulley comprises a cam lever 266 mounted to turn on the shaft and arranged to be forced against a shoulder 268 on the shaft by a heavy spring 270 interposed between the sleeve 264 and a thimble 272 which bears against the hub of the lever. The pressure of the heavy spring is relieved to release the brake by a cam surface on the hub of the lever adapted to engage a cam projection 274 formed on a fixed sleeve 276. The cam lever is rocked during the latter part of the taking-up stroke of the take-up so that the fixed projection 274 rides out of the depression in the hub of the lever and forces the lever away from the shoulder 268 against the tension of the spring 270, thus releasing the brake. The lever is thus rocked through connection with the take-up mechanism and the time at which the release of the brake takes place is controlled from the presser foot so that the thread lock will be uniformly located with relation to the surface of the work and the amount of thread pulled off will vary with the thickness of the work at the sewing point. The means shown for thus operating and controlling the locking and releasing of the tension roll comprises a lever 278, one end of which is connected by a link 280 with a cam lever 266, and the other end of which is connected by a link 282 with an arm 284 secured to one end of the rock shaft 286, the other end of which is provided with an arm 288 connected by a link 290 with a collar 292 on the rod 252 of the take-up mechanism. The upper end of the link 282 is connected with a pivot block 294 mounted for adjustment in a curved slot 296 formed in the arm 284 and the position of the pivot block in the arm, and consequently the timing of the release of the tension pulley, is determined by the position of an arm 298 secured to the end of the shaft 166 and slotted to embrace the pivot block. When the shaft 166 is rocked in bringing the presser foot yieldingly against the work the arm 298 shifts the pivot block at the upper end of the link 282 in the slotted arm 284 so that the point in the stroke of the take-up at which the cam lever 266 will be rocked into position to relieve the brake and release the tension roll will depend upon the position of the presser foot and consequently upon the thickness of the work engaged thereby.

The machine illustrated is provided with mechanism which, upon the release of the treadle by the operator, acts to automatically bring the machine to rest with the needle retracted and the parts in position for the removal of the shoe and is also provided with mechanism which acts to automatically sever the needle and locking threads and to hold the ends of these threads for the starting of the succeeding seam.

The driving and stopping mechanism comprises a driving shaft 300 provided with a pinion 302 which engages the lower gear 32 and is half the diameter of these gears. The shaft is driven through a friction driving clutch, the driving member 304 of which is loosely mounted on the shaft and is continuously driven from a motor 306 or otherwise (Figs. 1 to 3, 9, 10, 22 and 23). The driven member 308 of the clutch is keyed to rotate with and slide on the driving shaft and is moved toward and from the driving member through a sleeve 310 surrounding the hub of the clutch member and connected therewith by a heavy coiled spring 312. The sleeve is provided with an annular groove near its outer end engaged by rolls in the yoke-shaped upper end of a bell crank lever 314, the horizontal arm of which is arranged to be engaged by a collar 316 secured to the upper end of a rod 318, the lower end of which is connected to the treadle 160. The stop mechanism comprises a stop roll 320 carried by the end of a braking and stopping lever 322 and arranged to engage a spiral cam groove 324 formed in the periphery of the clutch sleeve 310. When the machine is in stopped position the abutment 326 on the clutch sleeve formed by the end of the groove engages the stop roll 320 and a locking roll 328 on the end of the lever also engages a locking recess 330 formed in a flange on the sleeve and locks the shaft in stopped position. The lever 322 is mounted to swing horizontally about a vertical stud 332 and is forced by a heavy coiled spring 334 in a direction to move the stop roll 320 toward the left in Figs. 2 and 10. The stud 332 is secured in a support 336 formed on the outer end of a rock shaft 338 which is forced by a heavy coiled spring 340 in a direction to engage the stop roll with the groove in the clutch sleeve. The lever is rocked vertically to disengage the stop roll from the groove in the clutch sleeve through a link 342 connecting the collar 316 at the upper end of the treadle rod 318 with the outer end of the lever.

When the treadle is depressed in starting the machine the lever is rocked to disengage the stop roll from the clutch sleeve by the initial downward movement of the treadle and then the collar 316 engages the bell crank lever 314 and continued downward movement and pressure on the treadle engages the driven clutch member with the driving clutch member, the speed of the machine being regulated by varying the pressure on the treadle. When the treadle is released the stop roll rides on the periphery of the clutch sleeve 310 until it enters the groove 324 and then during the continued rotation of the driving shaft the groove acting on the stop roll will first tend to complete the disengagement of the clutch members and thereafter to swing the rear end of the lever toward the right against the braking effect of the heavy spring 334. As the end of the cam groove approaches the stop roll the locking roll 328 will ride up the surface of the flange leading to the recess 330, thus increasing the braking effect upon the driving shaft immediately preceding the final stopping of the shaft. As the end of the groove engages the stop roll the forward rotation of the clutch sleeve 310 is arrested and the spring 312 will yield to cushion the blow, the locking roll 328 entering the recess 330 to prevent rebound of the sleeve and thus insuring the final stopping of the shaft and the parts connected therewith in a definite position. Since the driving shaft 300 makes two revolutions for each revolution of the cam shafts and therefore for each cycle of the machine the proper timing of the stop mechanism is insured by a timing cam 344 secured to the cam shaft 24 and arranged to engage a roll carried by an arm 346 on the rock shaft 338 and preventing the engagement of the stop roll with the groove in the cam sleeve during every second revolution of the driving shaft.

The mechanism for severing and holding the thread at the completion of the sewing consists of a thread cutter and holder mounted in the presser foot and operating to sever and hold the shuttle or locking thread close to the upper side of the work, and a thread cutter and holder mounted in the work support to sever and hold the needle thread close to the under side of the work. These cutters and holders are operated automatically at the completion of the sewing through mechanism which may be rendered active or inactive at the will of the operator so that the threads may be severed and held automatically in stopping the machine at the completion of the sewing or the machine may be stopped without severing the threads if for any reason it is desirable to do so. Means is also provided by which the operator may manually operate the thread cutters and holders whenever it is desirable to do so as, for instance, after threading up the machine and before starting a new seam or in case the machine has been stopped without automatically severing and holding the threads.

As shown the device for cutting and holding the locking thread comprises a severing and holding blade 348 mounted to swing and slide in the presser foot between a lower severing plate 350 and an upper gripping plate 352 located at one side of the slot 354 through which the needle passes (Figs. 14, 15 and 16). The blade is provided at its rear end with a pivot stud 356 passing up through a slot 358 in the presser foot and provided at its upper end with an arm 360 which is connected by a link 362 and universal joints to one arm of a bell crank lever 364 on the upper end of a rock shaft 366. The blade and stud are frictionally held from movement endwise of the slot by a spring 368 and friction washer 370. A similar cutting and holding blade 372 is mounted in a similar manner in the work support 2 to pass between an upper severing plate 374 and a lower gripping plate 376 located at one side of the needle slots 378. The arm 380 on the end of the pivot stud of this blade is connected by a link 382 with an arm 384 on the lower end of the rock shaft 366.

To operate the thread cutting and holding blades the rock shaft 366 is oscillated to first swing the free ends of the blades into position back of the needle path, to then slide the blades toward the right until the free ends are at the right of the needle path, then swing the free ends of the blades forward across the needle slots, and finally slide the blades toward the left to carry the threads between the cutting and gripping plates. The swinging movements of the blades in either direction are limited by stops 386 and 388 (Fig. 15) arranged to engage shoulders on the link 382 or universal joint at the right of link 362 and by their engagement to cause the blade to slide in the work support and presser foot during the continued movement of the link or universal joint.

The shaft 366 may be automatically oscillated at the completion of the sewing through a link 390 connecting the bell crank lever 364 with an arm 392 connected with the upper end of a vertical rock shaft 394 (Figs. 1, 2, 5 and 6). A coiled spring 396 is connected with a collar 398 near the lower end of the shaft and tends to rock the shaft in a direction to draw the cutter blades into position between the cutting and gripping blades. An arm 400 is secured to the lower end of the shaft and is provided with a cam projection 402 adapted to be operated upon by a pin 404 on the braking and stopping lever 322 when said lever is swung about its vertical pivot by the stopping cam groove in the clutch sleeve as heretofore described. When this lever is rocked vertically in starting the machine the pin 404 is swung down below the arm 400 and the horizontal swinging movement of the lever at this time carries the pin to the right of the cam projection 402 in Fig. 2 so that when the lever is swung in stopping the machine the pin engages the cam projection and rocks the shaft 394 against the tension of the spring 396 to retract the thread cutting blades and move them to the right, after which the pin passes beyond the cam projection so that the spring 396 quickly swings the cutters forward and draws them between the cutting and clamping plates.

The means by which the operator may render the mechanism for automatically actuating the thread cutters and holders active or inactive at will comprises a coupling lever 406 which is pivoted to the upper end of the rock shaft 394 and is arranged to engage a slot 408 formed in the upper edge of the hub of arm 392 which is loosely mounted on the upper end of the shaft. When the lever 406 is swung down into engagement with the slot in the hub of arm 392 the arm is connected with the rock shaft 394 and the thread cutters and holders are automatically operated in stopping the machine. If the lever 406 is swung upward into a vertical position it no longer engages the slot in the hub of arm 392 and the shaft 394 will, therefore, be oscillated idly upon stopping the machine without actuating the thread cutters and holders. The means for manually operating the thread cutters and holders comprises a handle 410 formed on the bell crank lever 364 and within convenient reach of the operator. By manipulation of this handle the rock shaft 366 may be manually rocked to operate the thread cutters and holders as desired.

While it is preferred to employ the specific construction and arrangement of parts shown and described in embodying the invention in a lock stitch outsole sewing machine it will be understood that this construction and arrangement is not essential to the broader features of the invention and may be varied or modified as found desirable or best suited to the construction and mode of operation of the machine in which it is to be embodied.

The mechanism herein disclosed for automatically severing the needle and locking threads and holding the ends of these threads for the starting of the succeeding seam is not claimed herein but forms the subject-matter of a separate application filed June 24, 1927, Serial No. 201,171.

What is claimed is:

1. A shoe machine having, in combination, operating instruments for performing an operation on the work comprising a curved hook needle, a looper, an awl and a feed slide, a head in which the instruments are mounted, a base on which the head is carried, actuating cams mounted in the base below the head, levers in the head back of the instruments and connected therewith, cam levers engaged by the cams, and connecting rods connecting the two sets of levers.

2. A shoe machine having, in combination, operating instruments for performing an operation on the work comprising a curved hook needle, a looper, an awl, and a feed slide, a head in which the instruments are mounted, a base on which the head is carried provided with a chamber adapted to hold an oil bath, actuating cams mounted to run in the chamber, and connections through which the instruments in the head are actuated from the cams in the oil chamber.

3. A wax thread shoe sewing machine having, in combination, stitch forming and work feeding devices comprising a curved hook needle, a looper, an awl, a feed slide and a shuttle, a head in which the devices are mounted, a base carrying the head, a series of actuating cams mounted in the base below the head, and connections through which the devices in the head are actuated from the cams in the base.

4. A shoe machine having, in combination, an oscillating instrument, a cam lever connected to oscillate said instrument, a second cam lever on which the first lever is pivoted, and two cam disks for oscillating the levers to give the first lever an oscillation in a single plane which is the resultant of the throw of the two cams.

5. A shoe machine having, in combination, an oscillating instrument, a cam lever connected to oscillate said instrument, a second lever on which the first lever is pivoted, and cams formed on two concentric rotating surfaces for oscillating the levers to give the first lever an oscillation in a single plane which is the resultant of the throw of the two cams.

6. A shoe machine having, in combination, an oscillating instrument, a cam shaft, two cams formed on concentric rotating surfaces on the cam shaft, a cam lever mounted on a fixed pivot at one side of the shaft and oscillated by one of said cams, a second cam lever pivoted to the free end of the first lever on the opposite side of the shaft and oscillated by the second cam, and connections through which the instrument is oscillated from the second lever.

7. A lock stitch sewing machine having, in combination, stitch forming mechanism including a work piercing instrument, a cam lever connected to oscillate said instrument, a second cam lever on which the first lever is pivoted, and cams for oscillating the levers to give the first lever an oscillation which is the resultant of the throw of the two cams.

8. A lock stitch sewing machine having, in combination, stitch forming mechanism including a work piercing instrument and an oscillating shuttle, and actuating mechanisms for the shuttle and instrument, each comprising a cam lever connected to oscillate the corresponding part, a second cam lever on which the first lever is pivoted, and cams for oscillating the levers to give the first lever an oscillation which is resultant of the throw of the two cams.

9. A lock stitch sewing machine having, in combination, stitch forming mechanism including a needle, an awl and an oscillating shuttle, and actuating mechanisms for said instruments, each comprising a lever connected to oscillate the corresponding instrument, a second lever on which the first lever is pivoted, and cams for oscillating the levers to give the first lever an oscillation which is the resultant of the throw of the two cams.

10. A sewing machine having, in combination, stitch forming mechanism, a work support, a presser foot, a presser foot lever connected therewith, means for pressing the foot yieldingly against the work, clamp jaws for gripping the lever, mechanism for actuating the clamp jaws to grip and release the lever and for positively moving the clamp jaws while gripping the lever to force the foot against the work.

11. A sewing machine having, in combination, stitch forming mechanism, a work support, a presser foot, a presser foot lever provided with a rib, means for pressing the foot yieldingly against the work, clamp jaws embracing the rib on the presser foot lever, mechanism acting to close and release the jaws and to positively move the jaws while closed to force the foot against the work.

12. A sewing machine having, in combination, stitch forming mechanism, a work support, a presser foot, a presser foot lever, means for pressing the foot yieldingly against the work, a clamp for gripping the lever, a toggle connected to move the clamp, and means for actuating the clamp during the straightening of the toggle to grip the lever before the straightening of the toggle is completed.

13. A sewing machine having, in combination, stitch forming mechanism, a work support, a presser foot, means for pressing the foot yieldingly against the work, a toggle for forcing the foot positively against the work, and mechanism acting during the straightening of the toggle to connect it with the foot before the straightening is completed, and for disconnecting and returning the toggle.

14. A sewing machine having, in combination, stitch forming mechanism, a work support, a presser foot, a presser foot lever, means for pressing the foot yieldingly against the work, a toggle, a block connected to be moved by the toggle, means for connecting the block with the lever during the straightening of the toggle, and before the straightening is completed, so that a uniform positive movement is given to the foot by the final straightening of the toggle, and means for disconnecting the block and returning the toggle.

15. A lock stitch sewing machine having, in combination, stitch forming mechanism including a curved hook needle and a looper, an awl, a feed slide on which the awl and needle are held permanently in the same plane, and means for imparting movements relative to each other to the needle and awl towards and from the work.

16. A lock stitch sewing machine having, in combination, a curved hook needle and a shuttle arranged on one side of the work, a looper and an awl arranged on the opposite side of the work, and a feed slide on which the awl and needle are held permanently in the same plane, and means for imparting movements relative to each other to the needle and awl towards and from the work.

17. A lock stitch sewing machine having, in combination, a work support, a presser foot, mechanism for actuating the presser foot to clamp and release the work, a curved hook needle, a looper, an awl, a feed slide on which the awl and needle are held permanently in the same plane, mechanism for advancing the slide to feed the work while the work is released and for retracting the slide while the work is clamped and means for imparting movements relative to each other to the needle and awl towards and from the work.

18. A sewing machine having, in combination, stitch forming mechanism, a device for engaging and feeding the work, mechanism for reciprocating said device comprising a toggle, the central joint of which is arranged to move from a point at one side of the line of centers to a point slightly beyond said line in advancing the feeding device, means for reciprocating said joint to advance and retract the feeding device, and means for varying said former point to vary the length of feed.

19. A sewing machine having, in combination, stitch forming mechanism, a device for engaging and feeding the work, mechanism for reciprocating said device comprising a toggle, one member of which is pivoted at a fixed point and the other member of which is connected to impart movement to the feeding device, and mechanism for oscillating the central joint of the toggle from a point at one side of the line of centers to a point slightly beyond said line during the feeding stroke of said feeding device.

20. A sewing machine having, in combination, stitch forming mechanism, a device for engaging and feeding the work, mechanism for reciprocating said device comprising a toggle, one member of which is pivoted at a fixed point and the other member of which is connected to impart movement to the feeding device, mechanism for oscillating the central joint of the toggle from a point at one side of the line of centers to a point slightly beyond said line during the feeding stroke of said feeding device, and means for varying the former point to vary the starting point of the feeding stroke.

21. A sewing machine having, in combination, stitch forming mechanism, a feeding device for engaging the work, a feed slide, a toggle, one member of which is pivoted at a fixed point and the other member of which is pivoted to the feed slide, and mechanism for moving the central joint of the toggle from a point at one side of the line of centers to a point slightly beyond said line to advance the feed slide and for returning said joint to the former point to retract the slide.

22. A sewing machine having, in combination, stitch forming mechanism, a feeding device for engaging the work, a feed slide, a toggle, one member of which is pivoted at a fixed point and the other member of which is pivoted to the feed slide, mechanism for moving the central joint of the toggle from a point at one side of the line of centers to a point slightly beyond said line to advance the feed slide and for returning said joint to the former point to retract the slide, and means for adjusting the mechanism to vary the former point only.

23. A lock stitch sewing machine having, in combination, a curved hook needle, a shuttle having its beak arranged to move along the needle toward its hook and to take the needle loop directly from the needle, and mechanism for advancing the needle to free its hook from the loop taken by the shuttle.

24. A lock stitch sewing machine having, in combination, a curved hook needle having its hook on the outside, a shuttle having its beak arranged to move along the needle in a direction opposite to the loop drawing stroke of the needle, and to take the loop directly from the needle, and mechanism for moving the needle in the direction of movement of the shuttle to free the hook from the loop taken by the shuttle.

25. A lock stitch sewing machine having, in combination, a curved hook needle, a shuttle mounted to move in a plane slightly inclined to the plane of the needle, and having its beak arranged to move along the needle in a direction opposite to the loop drawing stroke of the needle, and mechanism for relatively actuating the shuttle and needle to cause the shuttle to take the loop directly from the needle.

26. A sewing machine having, in combination, stitch forming mechanism including a needle, a lever for actuating the needle, a needle guide, connections for oscillating the needle guide from the needle actuating lever, a presser foot, and means for controlling said connections from the presser foot to vary the forward stroke of the needle guide.

27. A sewing machine having, in combination, stitch forming mechanism including a needle, a needle guide, mechanism for oscillating the needle guide comprising a lever connected to oscillate therewith and provided with a cam surface, a reciprocating actuator acting on the cam surface to oscillate the needle guide, a presser foot, and means for varying the position of the fulcrum of the lever with relation to the actuating member in accordance with the position of the presser foot.

28. A sewing machine having, in combination, stitch forming mechanism including a needle, a needle guide, a presser foot, a presser foot lever, a needle guide operating lever pivoted on an arm of the presser foot lever and provided with a cam slot, connections for oscillating the needle guide with the operating lever and a reciprocating actuator pin engaging the slot to rock the lever and oscillate the needle guide.

29. A sewing machine having, in combination, stitch forming mechanism including a needle, a needle guide, a presser foot, a needle guide operating lever, an actuating lever operating on the lever to operate the needle guide, and means for varying the relative positions of the actuator and the fulcrum of the lever to vary the forward stroke of the needle guide in accordance with the thickness of the work engaged by the presser foot.

30. A sewing machine having, in combination, stitch forming mechanism including a hook needle, a looper, a looper slide mounted to reciprocate in a plane substantially parallel to the surface of the work, a looper carrier mounted to oscillate on the slide, and a stationary cam for oscillating the carrier.

31. A sewing machine having, in combination, stitch forming mechanism including a hook needle, a looper, a looper slide mounted to reciprocate transversely of the feed in a plane substantially parallel to the surface of the work, a looper carrier mounted on the slide, and a stationary cam for actuating the carrier during the reciprocation of the slide to move the looper in the line of feed.

32. A sewing machine having, in combination, stitch forming mechanism including a curved hook needle, a looper, a looper slide mounted to reciprocate parallel to the plane of the needle and substantially parallel to the surface of the work, a looper carrier on the slide, and a stationary cam for actuating the carrier to move the looper transversely of the plane of the needle during the reciprocation of the slide.

33. A sewing machine having, in combination, stitch forming mechanism including a hook needle, a looper, a looper support mounted to reciprocate in a plane substantially parallel to the surface of the work, a looper carrier mounted on the support, and a stationary cam for actuating the carrier to move the looper transversely of the reciprocation of the support.

34. A sewing machine having, in combination, stitch forming mechanism including a hook needle, a slide mounted to reciprocate transversely of the line of feed in a plane substantially parallel to the surface of the work, and a looper and thread finger carried by the slide.

35. A sewing machine having, in combination, a hook needle, a looper, a looper support movable transversely of the feed in a plane substantially parallel to the surface of the work, and a thread finger on the support.

36. A sewing machine having, in combination, stitch forming mechanism including a hook needle, a support, mechanism for advancing and retracting the support in a plane substantially parallel to the surface of the work, and a looper and a thread finger carried on the support.

37. A sewing machine having, in combination, stitch forming mechanism including a hook needle, a support movable transversely of the line of feed in a plane substantially parallel to the surface of the work, a thread finger carried by the support, a looper carrier mounted on the support, and means for actuating the carrier to oscillate the looper during the movement of the support.

38. A lock stitch sewing machine having, in combination, stitch forming mechanism, a presser foot, the position of which varies with the thickness of the work, a combined take-up and pull-off, a lever connected to be operated from the take-up mechanism, a thread lock, means for operating the lock to release the thread comprising a lever and a link connecting it with said former lever, and means connected with the presser foot for shifting the link to vary the timing of the thread release.

39. A lockstitch sewing machine having, in combination, stitch-forming mechanism including a curved hook needle and a curved awl mounted to oscillate about a fixed axis and held permanently in the same plane, and means for imparting movements relative to each other to the needle and awl towards and from the work.

40. A sewing machine having, in combination, stitch-forming and work feeding devices, a feed slide, mechanism for reciprocating said slide comprising a toggle, and means for reciprocating the central joint of the toggle to advance and retract the slide.

41. A sewing machine having, in combination, stitch-forming and work feeding devices, a feed slide, mechanism for reciprocating said slide comprising a toggle the central joint of which is arranged to move from a point at one side of the line of centers to a point substantially in said line in advancing the slide to feed the work, and means for reciprocating said joint to advance and retract the slide.

42. A sewing machine having, in combination, stitch-forming and work feeding devices, a feed slide, mechanism for reciprocating said slide comprising a toggle the central joint of which is arranged to move from a point at one side of the line of centers to a point substantially in said line in advancing the slide to feed the work, means for reciprocating said joint to advance and retract the slide, and means for varying the action of the toggle to vary the length of feed.

43. A sewing machine having, in combination, stitch-forming and work feeding devices, a feed slide, mechanism for reciprocating said slide comprising a toggle the central joint of which is arranged to move from a point at one side of the line of centers to a point substantially in said line in advancing the slide to feed the work, means for reciprocating said joint to advance and retract the slide, and means for varying the path of said central joint to vary the length of feed.

44. A sewing machine having, in combination, stitch-forming and work feeding devices, a feed slide, mechanism for reciprocating said slide comprising a toggle the central joint of which is arranged to move from a point at one side of the line of centers to a point substantially in said line in advancing the slide to feed the work, means for reciprocating said joint to advance and retract the slide, and means for varying the action of the toggle to vary the length of feed while maintaining constant the point to which the slide is advanced.

BERNARD T. LEVEQUE.